(No Model.)
W. D. STEWART.
BATH TUB.
No. 370,098. Patented Sept. 20, 1887.
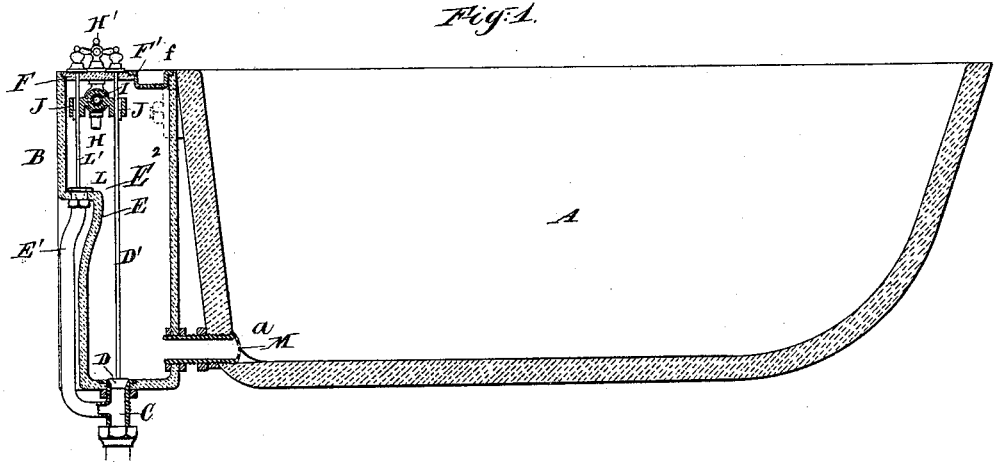
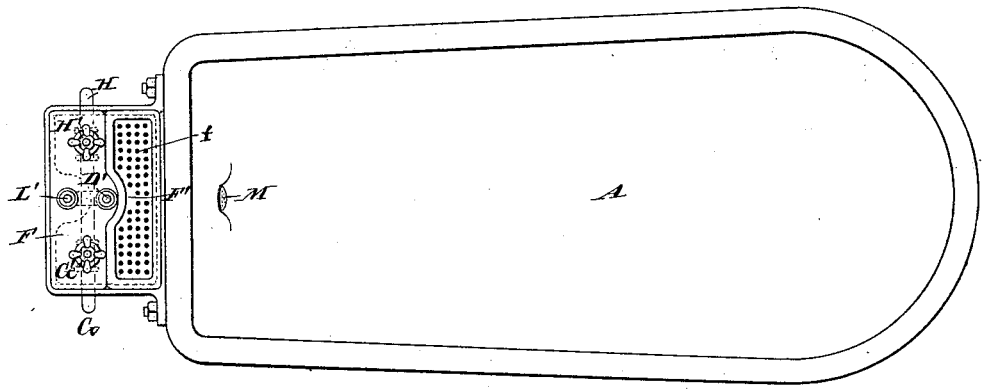
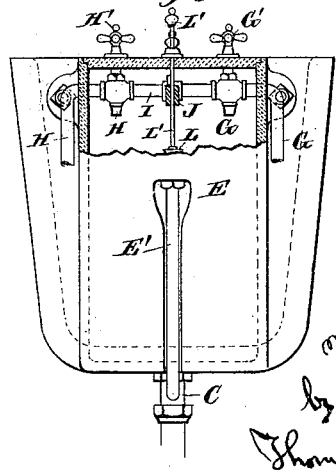
Witnesses:
Charles R. Searle,
H. A. Johnstone.
Inventor:
Wm D. Stewart
by his attorney
Thomas Drew Stetson

UNITED STATES PATENT OFFICE.

WILLIAM D. STEWART, OF BROOKLYN, NEW YORK.

BATH-TUB.

SPECIFICATION forming part of Letters Patent No. 370,098, dated September 20, 1887.

Application filed March 28, 1887. Serial No. 232,689. (No model.)

*To all whom it may concern:*

Be it known that I, WILLIAM D. STEWART, of Brooklyn, in the county of Kings and State of New York, have invented a certain new and useful Improvement in Bath-Tubs, of which the following is a specification.

I produce my bath-tub with an additional chamber at the foot, extending up and down the whole depth of the bath-tub and of sufficient width and breadth to receive the hot and cold water cocks, which may be connected in the ordinary way and perform their usual functions, except that they discharge into this chamber instead of directly into the main bath-tub. There is a sufficiently liberal passage at the bottom between this chamber and the body of the bath-tub to allow the water to flow freely to and from the main body. The discharge-pipe connects to the bottom of the chamber, and may be controlled by a plug. This plug is operated by a rod extending up to the top.

The bath-tub is formed in one piece of crockery or other ceramic ware, having a white inner surface nicely glazed. The additional chamber is formed in a separate piece, strongly and tightly attached.

There is but one connection to the bath-tub to serve all the functions of hot and cold water induction, overflow, and discharge. This is especially important with crockery tubs. The additional chamber may be of cast-iron or any other material desired, and may have ordinary connections to any desired number of pipes. I provide an overflow-passage in a recess in the back of the chamber at a height to which it is desired to limit the rise of the water in the tub. This overflow-passage is controlled by a plug, and is kept tightly closed when not in use, thus preventing any escape of sewer-gas. I provide a removable cover, serving also as a soap-dish, which allows easy access to my additional chamber for cleaning. I provide peculiarly simple and efficient means of guiding and supporting the rods which control the overflow-valve and the discharge-valve.

The accompanying drawings form a part of this specification, and represent what I consider the best means of carrying out the invention.

Figure 1 is a central longitudinal vertical section. Fig. 2 is a plan view, and Fig. 3 is an end view, a portion of the chamber being broken away.

Similar letters of reference indicate corresponding parts in all the figures where they occur.

A is the main body, of ceramic ware.

B is a piece forming the additional chamber. It is preferably formed of the same ware, both the parts having a white glazed interior. It is important to afford every facility for easy and thorough cleansing. The interior of the main body A and of the chamber B communicate through a short pipe, $a$, at the bottom.

D is the discharge-plug, operated by a rod, D', and matching in the tapering mouth of the discharge-pipe C.

E is a recess formed by a right-angled bend, $E^2$, in the back face of the chamber, having a pipe, E', seated therein, forming an overflow-passage in free communication with the interior of the chamber at the level to which it is desired to limit the rise of the water in the tub. This connects with the discharge-pipe C in any ordinary or suitable way, and, with or without a trap, is led away.

L is a plug matching into the tapering mouth of the overflow-pipe E'. It is raised and lowered by the rod L'.

F is the cover of the chamber. A removable portion, F', is sunk so as to form a capacious dish, the bottom being perforated, as indicated by $f$. Soap or other toilet articles are stored in this dish.

I provide a perforated cover or strainer, M, which covers the passage $a$. This is of especial service in preventing loose foreign substances from being washed out through the passage $a$ and allowed to choke the discharge-pipe C. The passage $a$ should be at the extreme bottom of the interior of the structure.

The bath-tub should be set on a slight incline, so that on removing the discharge-plug D all the water will be discharged from the entire interior. The hot and cold water are admitted through two pipes, G and H, controlled by two stop-cocks, G' and H'. A round bar, I, extends laterally between the cocks G' and H', and forms a support for the yoke J, which serves as a vertical guide for the rods D' L' for operating the plugs D and L. A hole in each end of the yoke J is formed with a spline-groove, into which matches a short feather on each of the rods D' L'. When it is desired to lift either of the plugs D and L, the corresponding rod is raised vertically until the feather has passed entirely through the guide. By then turning the rod in either direction the feather will rest upon the upper surface of the guide or yoke J, and prevent the plug from falling until the operation is reversed.

I attach importance to high valve L, operated by a rod, L', and connected by a pipe, E', with the discharge-passage C, because its location forbids its emptying the bath-tub and limits it to serving simply as an overflow-valve, while the connection allows it to be tightly closed to stop sewer-gas with absolute certainty, when desired. I attach importance to the yoke J, as forming a simple and efficient guide for the rods D' and L' and a reliable support for the valves D and L when they are to be held open, thus relieving the fixed top board, F, from any strain and allowing it to serve simply as a smooth and rich finish for the top, with smooth round rods playing through it. I attach importance to the removable cover F', as affording an ample opening over a clear portion of the chamber, through which the hand and arm may be inserted for cleaning. Its hollow and perforated condition is also important in allowing it to perform another function—that of a convenient holder for soap.

I claim as my invention—

1. In a bath-tub, the combination, with the tub A, of a supplemental chamber, B, removably secured to the tub and provided with a recess, E, formed by a right-angled bend, $E^2$, in the rear of the chamber, and the pipes C E', connected together and both attached to said chamber, said pipes provided with plugs having rods, said rods connected to a yoke, and the said pipe E', located in the recess, all arranged to operate jointly, substantially as specified.

2. In a bath-tub, the combination, with the tub, of a supplemental chamber removably secured to said tub and having a right-angled bend forming a recess at the rear of the chamber, as shown, a pipe located in said recess, and a pipe attached to the pipe in said recess, and both of said pipes attached to the chamber and a pipe secured to the chamber and to the end of the tub, all arranged to operate jointly, as shown and described.

In testimony whereof I have hereunto set my hand, at New York city, N. Y., this 26th day of March, 1887, in the presence of two subscribing witnesses.

W. D. STEWART.

Witnesses:
H. A. JOHNSTONE,
M. F. BOYLE.